July 19, 1938.  F. P. RIDDELL  2,124,313
EJECTOR FORK
Filed Oct. 19, 1936

INVENTOR.
Fred P. Riddell.
BY
Geo. Stevens.
ATTORNEY.

Patented July 19, 1938

2,124,313

UNITED STATES PATENT OFFICE 2,124,313

EJECTOR FORK

Fred P. Riddell, Superior, Wis.

Application October 19, 1936, Serial No. 106,393

3 Claims. (Cl. 30—129)

This invention relates to forks, and has special reference to what is commonly called a serving fork, particularly adapted for use in cafeterias, or the like.

The principal object of the present invention is simplicity of construction and operation of the device, it having as few parts as possible.

Furthermore the present device is deemed novel in that the operator manipulates the tines of the fork in both directions.

Other objects and advantages of the invention will appear in the following description thereof.

Referring now to the accompanying drawing, forming part of this application, and wherein like reference characters indicate like parts:

Figures 1, 2:
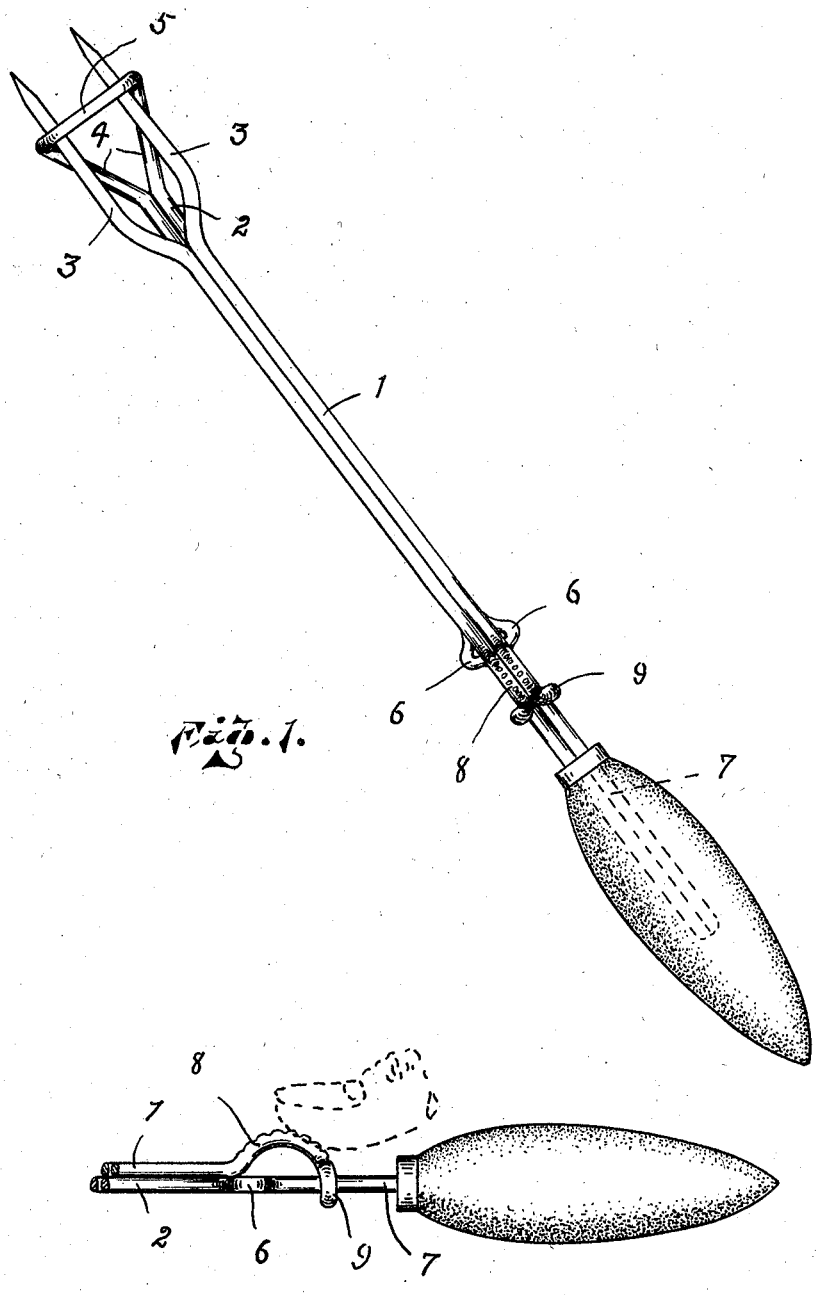
Figure 1 is a top plan view of one of my complete forks with the tines thereof partly extended.
Figure 2 is a side elevation of the handle portion of the device.

I am aware that numerous forms of serving forks have been devised having various means for ejecting foodstuffs therefrom, but, to my knowledge, in none of which the tines of the fork are adjustable independently of the handle and main body portion of the mechanism, and this is deemed a marked departure in the art and conducive to simplicity and convenience.

In the embodiment here illustrated, I have shown two pieces of wire-like material, folded centrally upon themselves, and each having a principal body portion 1 and 2, and wherein the body portion of the two pieces of wire lie closely against each other and one slidable upon the other.

The free terminals of the body portion 1 form the tines of the fork, they being shown at 3; and at the bight or fold of the body portion illustrated at 2, the wire is flared outwardly as at 4, thence turned upwardly forming the ejector guide 5 surrounding the tines 3, thus forming suitable guides and ejector means for the tines of the fork. To the opposite end of the wire having the body portion indicated at 2, the wire is spread laterally or kinked slightly as indicated at 6, forming a stop, and limiting in one direction the movement of the fork member thereon, and is continued a suitable distance rearwardly, as at 7, for assembly within a wooden handle; the latter having an axial opening in one end thereof for the forced reception of the wire, as clearly indicated. It is obvious, however, that the handle of the device may be formed in any other manner suitable for the purpose.

The inner end or folded portion of the wire piece indicated at 1 is arched upwardly as at 8, and then bent downwardly sharply to form an eye as at 9 about the body portion 2, and also providing a convenient thumb or manipulating member by means of which the tines are reciprocable as desired, thus obviating the necessity of springs or other complicated mechanism. The outer surface of the arched portion 8 is knurled so that the finger manipulating same is not so apt to slip during the operation thereof.

The movement of the tines is of course limited to the distance between the end of the handle and the stop 6 and is just sufficient to permit the tines to be withdrawn so that anything thereon will be forced therefrom by the ejector portion 5, but the ends of the tines cannot be withdrawn through the portion 5 and become separated.

The portion 5 thus becomes a bearing at one end for the reciprocable fork member and the eye 9 a bearing at the other end, and provides a very simple, conveniently operated, and easily manufactured ejector fork.

Having thus described my invention, what I claim and desire to secure by Letters Patent, is:

1. A serving fork consisting of two pieces of wire, each folded centrally upon itself and forming substantially parallel portions, the terminals of one piece forming the tines of the fork, and the fold of the other piece extending about and forming an ejector and guide for said tines, a handle formed adjacent the free ends of the latter piece, and means slidably uniting the body portions of each piece in relation to each other.

2. A serving fork consisting of two pieces of wire each folded centrally upon itself forming substantially parallel equal portions of each piece, the terminals of one piece being bent outwardly and again parallel with the body portion forming the tines of the fork, the other piece being flared outwardly beyond the tines, then turned upwardly and inwardly around said tines and forming a support therefor, means for slidably uniting said pieces thus folded and assembled, and a handle for said instrument.

3. A serving fork consisting of two pieces of wire each folded centrally upon itself and about the other piece and thereby slidably uniting the body portions of each piece in relation to each other, the free ends of one piece being spaced apart and forming the tines of the fork and the free ends of the other piece being forced into a handle for the fork, and the fold of the other piece extending across the tines, whereby when the tines are withdrawn any object on said tines will be ejected therefrom.

FRED P. RIDDELL.